United States Patent
Fujimura et al.

(10) Patent No.: US 8,031,906 B2
(45) Date of Patent: Oct. 4, 2011

(54) TARGET ORIENTATION ESTIMATION USING DEPTH SENSING

(75) Inventors: Kikuo Fujimura, Palo Alto, CA (US); Youding Zhu, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 151 days.

(21) Appl. No.: 12/572,619

(22) Filed: Oct. 2, 2009

(65) Prior Publication Data

US 2010/0034427 A1    Feb. 11, 2010

Related U.S. Application Data

(62) Division of application No. 10/868,707, filed on Jun. 14, 2004, now Pat. No. 7,620,202.

(60) Provisional application No. 60/478,211, filed on Jun. 12, 2003.

(51) Int. Cl.
*G06K 9/00* (2006.01)
(52) U.S. Cl. ......... 382/103; 382/159; 382/291; 348/169
(58) Field of Classification Search .................. 382/103, 382/159; 348/169
See application file for complete search history.

(56) References Cited

U.S. PATENT DOCUMENTS

| | | | |
|---|---|---|---|
| 6,671,391 B1 * | 12/2003 | Zhang et al. | 382/118 |
| 6,804,416 B1 * | 10/2004 | Bachelder et al. | 382/294 |
| 6,959,109 B2 * | 10/2005 | Moustafa | 382/159 |
| 7,313,266 B2 * | 12/2007 | Ishiyama | 382/154 |
| 2001/0043738 A1 * | 11/2001 | Sawhney et al. | 382/154 |
| 2005/0265583 A1 * | 12/2005 | Covell et al. | 382/103 |

FOREIGN PATENT DOCUMENTS

| | | |
|---|---|---|
| JP | 11-047196 | 2/1999 |
| JP | 2000-222585 | 8/2000 |
| JP | 2001-143075 | 5/2001 |
| JP | 2001-250121 | 9/2001 |
| JP | 2003-058884 | 2/2003 |
| JP | 2003-141551 | 5/2003 |

OTHER PUBLICATIONS

Japanese Final Office Action, Japanese Patent Application No. 2006-516618, Mar. 19, 2010, 4 pages.
Japanese Non-Final Office Action, Japanese Patent Application No. 2006-516618, Dec. 21, 2009, 7 pages.

(Continued)

*Primary Examiner* — John Strege
(74) *Attorney, Agent, or Firm* — Fenwick & West LLP; Mark E. Duell

(57) ABSTRACT

A system for estimating orientation of a target based on real-time video data uses depth data included in the video to determine the estimated orientation. The system includes a time-of-flight camera capable of depth sensing within a depth window. The camera outputs hybrid image data (color and depth). Segmentation is performed to determine the location of the target within the image. Tracking is used to follow the target location from frame to frame. During a training mode, a target-specific training image set is collected with a corresponding orientation associated with each frame. During an estimation mode, a classifier compares new images with the stored training set to determine an estimated orientation. A motion estimation approach uses an accumulated rotation/translation parameter calculation based on optical flow and depth constrains. The parameters are reset to a reference value each time the image corresponds to a dominant orientation.

11 Claims, 11 Drawing Sheets

OTHER PUBLICATIONS

European Patent Office, Supplementary European Search Report, Patent Application No. EP 04769493.0, Aug. 11, 2010, five pages.

Hattori, K. et al., "Estimating Pose of Human Face Based on Symmetry Plane Using Range and Intensity Images," *Proceedings of the IEEE Fourteenth International Conference on Pattern Recognition*, 1998, pp. 1183-1187, vol. 2, Brisbane, Australia.

Liu, X. et al., "Real-time Pose Classification for Driver Monitoring," Proceedings of the IEEE Fifth International Conference on Intelligent Transportation Systems, Sep. 3-6, 2002, pp. 174-178, Singapore.

McKenna, S.J. et al., "Real-Time Face Pose Estimation," *Real-Time Imaging*, 1998, pp. 333-347, vol. 4, Article No. ri980127.

Nanda, H. et al., "Illumination Invariant Head Pose Estimation Using Single Camera," *Proceedings of the IEEE Intelligent Vehicles Symposium*, 2003, pp. 434-437.

Niyogi, S. et al., "Example-Based Head Tracking," *Proceedings of the Second IEEE International Conference on Automatic Face and Gesture Recognition*, 1996, pp. 374-378.

* cited by examiner

TARGET ORIENTATION ESTIMATION USING DEPTH SENSING

RELATED APPLICATIONS

This application is a divisional application under 35 U.S.C. §121 of, and claims priority under 35 U.S.C. §120 from, co-pending U.S. patent application Ser. No. 10/868,707 entitled "Target Orientation Estimation Using Depth Sensing," filed on Jun. 14, 2004, which claims priority from U.S. Provisional Patent Application Ser. No. 60/478,211 titled "Adaptive Face Pose Learning Using Depth Sensing," filed on Jun. 12, 2003, which are incorporated herein by reference in their entirety. This application is also related to co-pending U.S. patent application Ser. No. 10/857,581 filed on May 28, 2004 entitled "Visual Tracking Using Depth Data" by Fujimura, et al., which is incorporated herein by reference in its entirety.

FIELD OF THE INVENTION

The present invention relates generally to real-time computer vision and more particularly to computer based estimation of target orientation or pose.

BACKGROUND OF THE INVENTION

Pose estimation is a key component for many areas of real-time computer vision such as Human-Computer Interaction. For example, work has been done for driver monitoring to determine head pose using various facial cues to derive related attentiveness information. For a driver assistant system, driver fatigue or attention monitoring is useful in order to alert the driver when safety concerns arise. In other more general human-computer interaction applications, head pose estimation is important for tasks that require information on user attention, such as for example, display control, online instruction, or the like. In addition, target orientation estimation is useful in other machine vision applications, for example, for object identification, face recognition, and the like.

Conventional approaches for orientation estimation (either from a still image or from an image sequence) can generally be grouped into two major categories. The first category includes appearance-based methods, which use pattern classification techniques based on the extracted feature vectors from target images. The second category includes approaches based on motion estimation, which use motion analysis techniques between successive images.

Appearance-based technology is generally based on image comparisons using pattern-classifier technologies, such as, for example, Naïve Bayesian Classifier, Support Vector Machines ("SVM"), Neural Networks, Hidden Markov Model ("HMM"), or the like. These classifiers have been successfully used in many applications but they are not without disadvantages. They need a large number of training examples, which are usually collected manually, each of which needs to be aligned exactly in order to extract feature vectors useable for comparison between a target and the model in the training samples. There are always some instances where classification fails, primarily related to appearance variation.

The physical differences in appearance between the model and the target present a problem for appearance-based classification. Particularly, in human face classifiers, selecting a set of features in a human face that can be tracked across all poses, between frames, and across a variety of target human faces presents a challenging problem. Particularly, when determining side poses since the side face appearance generally lack distinct features that are shared among the general population as compared to the front face. It is difficult to define a "common appearance" that applies to everybody. Appearance variation can be a problem even when operating on the same subject. For example, a person may be wearing sunglasses, wearing a hat, may shave off a beard, or the like. In addition, lighting conditions negatively impact the classification performance.

Therefore, appearance-based orientation estimation systems that operate based on generic model databases can typically only achieve limited recognition performance. The great appearance variation between model and targets, or even between the same target at different times leads to unstable results.

The other generalized approach is based on motion estimation technology. Motion estimation technology for pose estimation is generally based on visually recognizable features of the target. For example, human face pose estimation is generally based on the identification of face features, such as, eyes, nose, mouth, and the like. This identification of particular features in an image is a hard problem on its own right. For example, conventional systems detect front faces in a scene through an exhaustive search based on various perceptual cues, e.g. skin color, motion, or the like. Once a face has been detected, the face region is tracked using related information such as facial features, edges, color, depth, and motion, or the like. For real-time applications, e.g., live video, these methods under perform, particularly when the environment has a cluttered background.

These techniques suffer from several critical problems. For instance, automatic model pose initialization is still a difficult problem. Another drawback of motion estimation techniques is that the angle estimate is accurate only for a relatively short image sequence because error accumulation due to the incremental nature of the angle computation becomes too large for a long sequence. Eventually, the estimated angle drifts completely out of phase.

Thus, there is a need for orientation estimation methods and systems that are based on (1) real-time image data, (2) are robust against appearance variation, and (3) can operate over long sequences without drifting.

SUMMARY OF THE INVENTION

One embodiment of a computer-based method for estimating the orientation of a target, e.g., a driver, uses depth image data from a time-of-flight camera. According to this embodiment, a feed of depth images capturing the target is received. The depth images include pixel depth information for the pixels in the images. Based on an initial set of images, a correlation between each image and a corresponding orientation measure is determined. The set of images is representative of a set of orientations of the target with respect to a particular application. The correlation provides a match between an image and a corresponding orientation measure representative of the orientation of the target captured in the image. Then, the set of images of the target and the correlation are stored. An appearance based comparison between a current depth image of the target and the stored set of images is made to determine, based on the correlation, a corresponding orientation measure indicative of a current orientation of the target as captured in the current depth image.

In one embodiment of the correlation includes a mapping between a set of known orientations and the set of images. In an alternative embodiment, determining the correlation includes determining a primary orientation by analyzing the set of images, assigning a reference orientation measure to the images that capture the target in the primary orientation, and determining an orientation measure for other images in the set of images that capture the target in orientations other than the primary orientation. The orientation measure is calculated based on optical flow of feature points in the images of the target with respect to the reference orientation measure. In one embodiment, the optical flow of feature points is based in part on the pixel depth information corresponding to the feature points in the image.

In another embodiment, the variation in appearance of the target is determined with a variation value. In response to exceeding a maximum variation, the correlation is determined again for a second set of images and the new correlation is stored. Then, the stored set of images is replaced with the second set of images. Accordingly, when the target's appearance varies significantly, a new training set is re-recorded.

Another embodiment of a computer based method for estimating a real-time orientation measure uses a feed of depth video frames as input. The depth video frames capture the target in real-time and include depth pixel data. A target-specific training set of depth video frames is stored during an initial training period. Of these set of target-specific frames, the frames capturing the target in a dominant orientation are identified by analyzing the data in the depth video frames. Then, an appearance based comparison between a current depth video frame and the stored target-specific training set is used to determine whether the current frame is of an image capturing the target in the dominant orientation. If it is, the current orientation measure is set to a reference orientation measure otherwise, the current orientation measure is determined based on depth data corresponding to the current frame. The current orientation measure corresponds to the current orientation of the target as captured in the current depth video frame.

In one embodiment, a system includes a time-of-flight camera and a computer processing system that is coupled to the time-of-flight camera. The time-of-flight camera is configured to capture a real-time video of a target and to operate within a depth window, the real-time video includes a stream of frames, each frame including hybrid image data that includes color and depth information for each pixel. The computer processing system is coupled to the camera for receiving the real-time video and is configured to output an estimated orientation of the target. The estimated orientation of the target is based upon an appearance classification of the current frame using a target-specific training image set and also based on motion estimation calculations using position changes of feature points of the target between frames of the video stream and constrains given by the corresponding depth information.

In one embodiment, the computer processing system includes several modules. An input/output module receives the real-time video stream from the time-of-flight camera and provides the estimated orientation of the target. A segmentation and tracking module is coupled to the input/output module for receiving hybrid image data for each frame and is configured to provide a segment of the image data corresponding to the set of pixels containing the image of the target. This module is also configured to determine the segment of the image data based on depth information included in the hybrid image data. An adaptive learning module is coupled to the segmentation and tracking module for receiving the hybrid image data and the corresponding segment. The adaptive learning module is configured to compose the target-specific training image set from an initial set of video frames of the target captured by the time-of-flight camera during a training period. The target-specific training image set includes frames of the target with a corresponding orientation measure. Finally, an appearance classifier module is coupled to the segmentation and tracking module for receiving the segment of the image data of a current video frame corresponding to the target. The module is also coupled to the input/output module for providing the estimated orientation of the target in the current video frame. The appearance classifier module is configured to compare the current video frame with the target-specific training image set and to estimate the current orientation based on the orientation corresponding to the frame most similar to the current frame.

In an alternative embodiment, the system also includes a motion estimation module that is coupled to the segmentation and tracking module for receiving the segment of the current video frame with the target images in it. The motion estimation module is also coupled to the input/output module for providing the estimated orientation of the target in the current video frame. In addition, this module is coupled to the appearance classifier module for receiving an indication upon determining that the current video frame corresponds to a dominant orientation. The motion estimation module is configured to calculate a current orientation measure based on the position changes of feature points of the target between frames of the video stream and the constrains given by the corresponding depth information. The module is also configured to reset the current orientation measure to a reference value upon receiving the indication that the current video frame corresponds to the dominant orientation.

In one embodiment of the system, the time-of-flight camera is mounted in a vehicle cabin for capturing the real-time video of a target driver, and the computer processing system is part of a vehicle safety system that includes safety features configured to operate based on the estimated orientation of the driver.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1A:
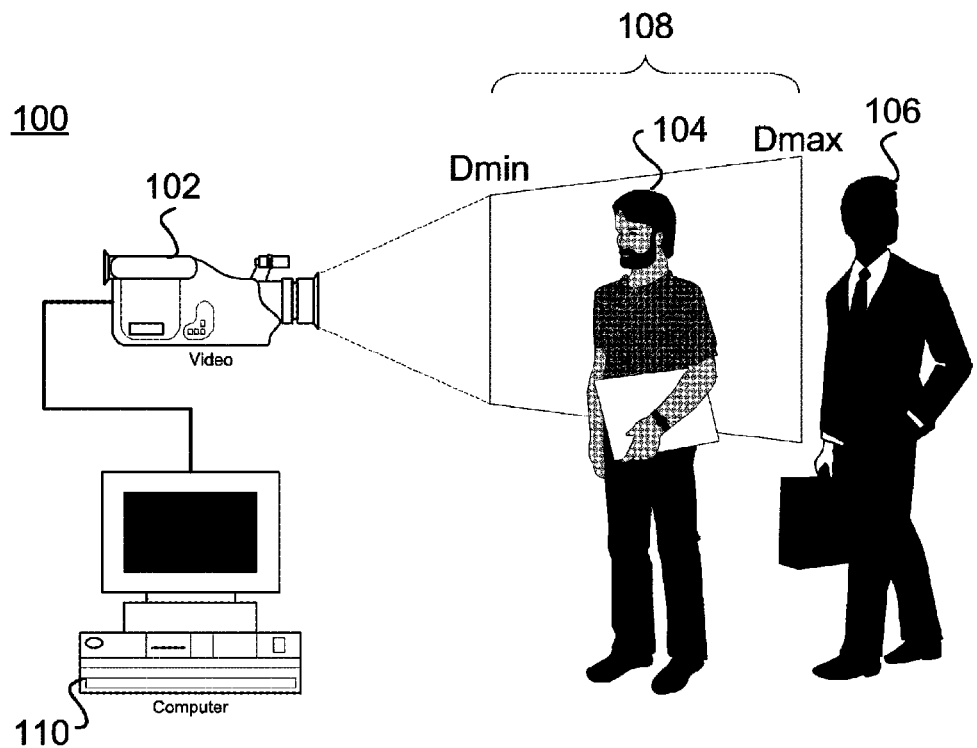
FIG. 1A shows one embodiment of an orientation estimation system configuration.

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Referring now to FIG. ("FIG.") 1A, one embodiment of an orientation estimation system configuration is shown. The orientation estimation system 100 in this embodiment uses depth-sensing technology. Depth-sensing technology is based on the time-of-flight principle. Cameras using this technology are known as time-of-flight cameras. In the present embodiment, the image capturing method of camera 102 is based on active sensing with a time-of-flight camera. Active depth sensing is performed with a pulse of infrared illumination. The pulse is projected to the target 104 and the sensor reads its echo signal reflected from the target 104. Furthermore, the camera 102 has a high-speed shutter by which it controls the sensing scope for targets whose signal can enter the sensor. For a far object 106, the echo can reach the sensor in the camera 102 only after the shutter has been closed. Thus, no signal is recorded for the corresponding object 106 (thus, most background objects disappear from the recorded scene). This feature of the depth-sensing camera 102 beneficially provides a range [Dmin, Dmax] of operation, referred to as depth window 108. Depth information is recorded only for objects (e.g., target 104) in this range of operation or depth window 108. Other objects 106 beyond the depth window 108 do not produce depth data, i.e., the reflected signal reaches the camera after the shutter has closed. This unique feature eliminates background clutter by setting Dmax immediately behind the target 104 being imaged (i.e., ignores the presence of any object 108 beyond the Dmax depth).

Figure 2A:
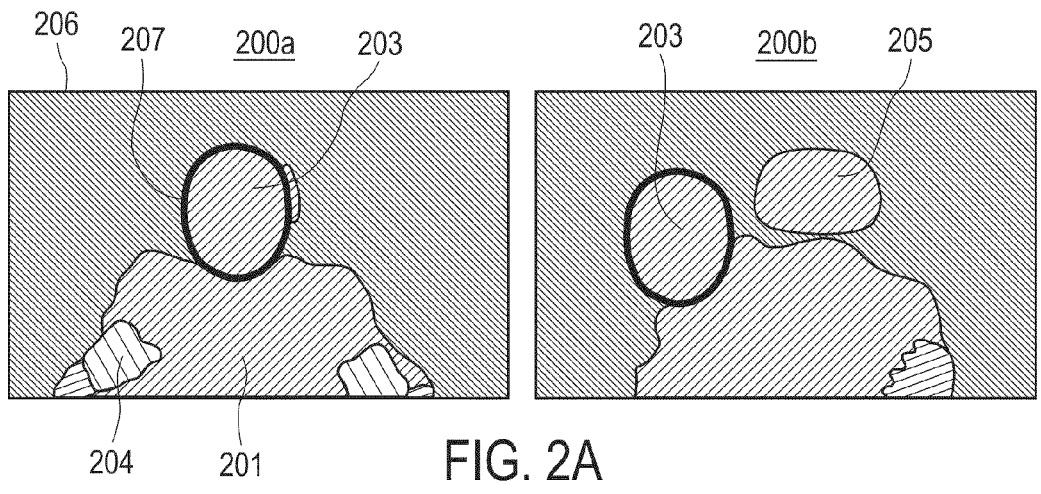
FIG. 2A shows depth images of a driver in different positions.
Figure 2B:
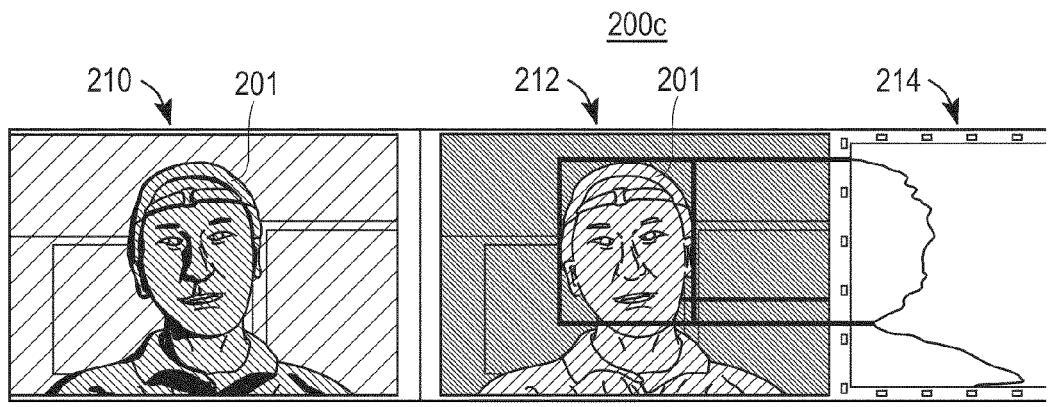
FIG. 2B shows a depth image with its corresponding color and depth data visual representations.
Figure 2C:
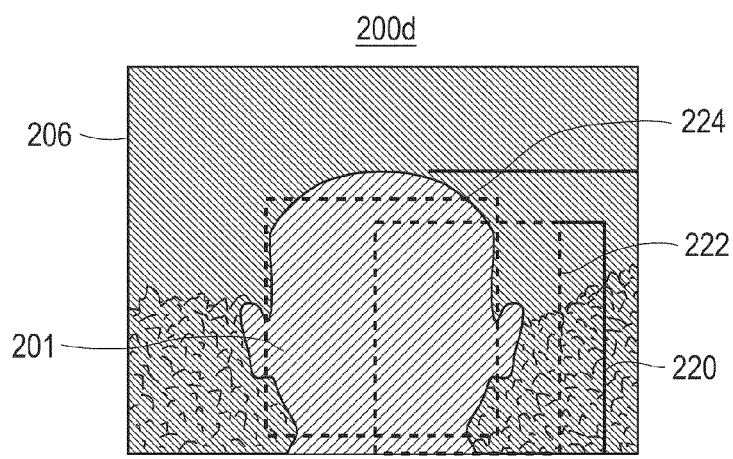
FIG. 2C shows an alternative embodiment of a tracking mechanism using depth images.

The depth camera 102 produces hybrid image data, generally referred to as depth video data. Hybrid image data or depth video is produced by capturing depth and color information simultaneously using the same optical axis in real-time. Although the image rate may vary, one embodiment of the system 100 operates with a stream of video at 14 frames per second. FIGS. 2A, 2B, and 2C show examples of output frames 200 from a depth camera 102. In the context of this discussion, color information is meant to include "black and white" (grayscale) data and what is generally referred to as color data (e.g., RGB/color). For example, referring now to FIG. 2B, the color information part 210 of the hybrid image 200c is similar to a conventional digital image, that is, "color" and related information is provided for every pixel. The depth information part 212 of the hybrid image 200c includes depth values for every pixel, which, as further described below, is visually represented with varying levels of brightness.

Compared to stereoscopic systems, the depth camera system 100 includes several improved characteristics, for example, the image is illumination-invariant in in-door environments, as long as the environment does not contain light of the same wavelength used for pulse of the sensor; any error in depth is approximately 5~15 mm for 0.5~3 m depth window 108; depth information is recorded in the separated depth image part 212 (8 bits a pixel). This gives sufficient separation between the hand and the body used for gesture recognition; hybrid sensing, i.e., both depth and color images are captured at real-time speed (e.g., 30 frames/sec); depth for objects with no texture (such as walls) can still be obtained. All these improved features and other features are provided with a single camera system 100 as opposed to a multi-camera stereoscopic system. The single camera system 100 also provides the additional benefit of obviating the need for calibration between the two or more cameras of a conventional stereoscopic multi-camera system.

As mentioned above, the pose estimation system 100 shown in FIG. 1A includes one time-of-flight camera 102, such as, for example, a camera manufactured by 3DV Systems, of Yokneam, Israel, or Canesta, Inc., of San Jose, Calif. The time-of-flight camera 102 is set to a depth window 108 that includes the area within which the target 104 being tracked will move about. Non-target objects 106, e.g., background objects, are not part of the depth image information. The depth-sensing camera 102 is connected to a computer 110. In one embodiment, the computer 110 includes an image-processing library, such as for example, Intel's image processing library, from Intel Corporation of Santa Clara, Calif., and runs at 14 frames per second (320×240 pixels) on a 1.2 GHz Pentium III processor by Intel Corporation. In another embodiment, the depth-sensing camera 102 is part of a robotic vision unit and the computer 110 is a module within the robot's control logic. Yet another embodiment includes a depth-sensing camera 102 in a vehicle cabin connected to a computer 110 in a data processing control unit within the vehicle, for example, for controlling driver assistance features or other vehicular safety features. Thus, generally, computer 110 includes any data processing capable system, ranging from a micro-chip controller, embedded processor, or the like, to a workstation, or personal computer type system.

Figure 1B:
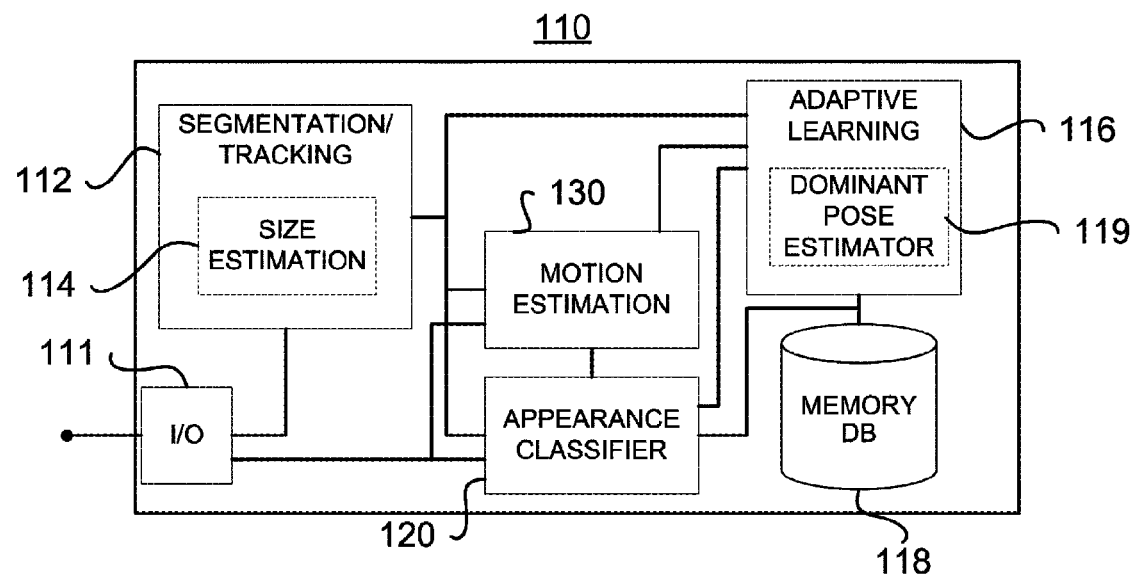
FIG. 1B shows a block diagram of one embodiment of an orientation estimation computer.

Computer 110 includes several modules that can be implemented using hardware circuits; software code stored in a memory or some other computer readable medium and executed by a computer processor (e.g., a general purpose processor, an embedded processor, a digital signal processor or the like); or by a combination of hardware circuits and software code. FIG. 1B shows a block diagram of one embodiment of an orientation estimation computer. According to this embodiment, the segmentation and tracking module 112 receives image data from a depth-sensing camera through an input/output port 111. Drivers for interfacing with the camera can be included and may be specific to a particular camera type or model. The segmentation and tracking module 112 include algorithms to determine which pixels in the image data correspond to the target 104. In particular, the tracking section of the module produces an output that can visually indicate within the image an area corresponding to the target 104 and how it moves from frame to frame (e.g., an ellipse or window enclosing the target). In one embodiment, the segmentation and tracking module 112 also includes a size estimation module 114. The size estimation module 114 provides size data specific to the shape of a target 104 to facilitate the segmentation and tracking of the target 104 in an image. The segmentation and tracking module 112 is connected to the adaptive learning module 116. The adaptive learning module 116 includes algorithms to capture a training image set with a corresponding orientation value. In one embodiment, the orientation values are given as input while in an alternative embodiment the orientation values are derived from the image data. The adaptive learning module 116 is connected to a memory 118 (e.g., an image database) to store the training image set. In one embodiment, the adaptive learning module 116 includes a dominant pose estimator 119 to determine the frames in the image data corresponding to a most frequent pose. The adaptive learning module 116 is also connected to an appearance classifier module 120 and to a motion estimation module 130.

The appearance classifier module 120 receives inputs from the segmentation and tracking module 112 and has access to memory 118. During normal operation, the appearance classifier module 120 compares input images to images in the stored training set to determine an orientation based on the known poses of the stored training set. In one embodiment, the appearance classifier 120 is connected to the motion estimation module 130. The motion estimation module 130 receives an input from the segmentation and tracking module 112 and determines the orientation of the target 104 based on features tracked between images. The motion estimation module 130 is connected to the adaptive learning module 116 to provide orientation values for the training image set. During normal operation, in this embodiment, the motion estimation module 130 receives an input from the appearance classifier 120 to indicate a reset condition as further described below. The appearance classifier 120 and the motion estimation module 130 can be coupled to the input/output port 111 to provide the orientation value to other components within or interfacing with the orientation estimation system 100.

Figure 3A:
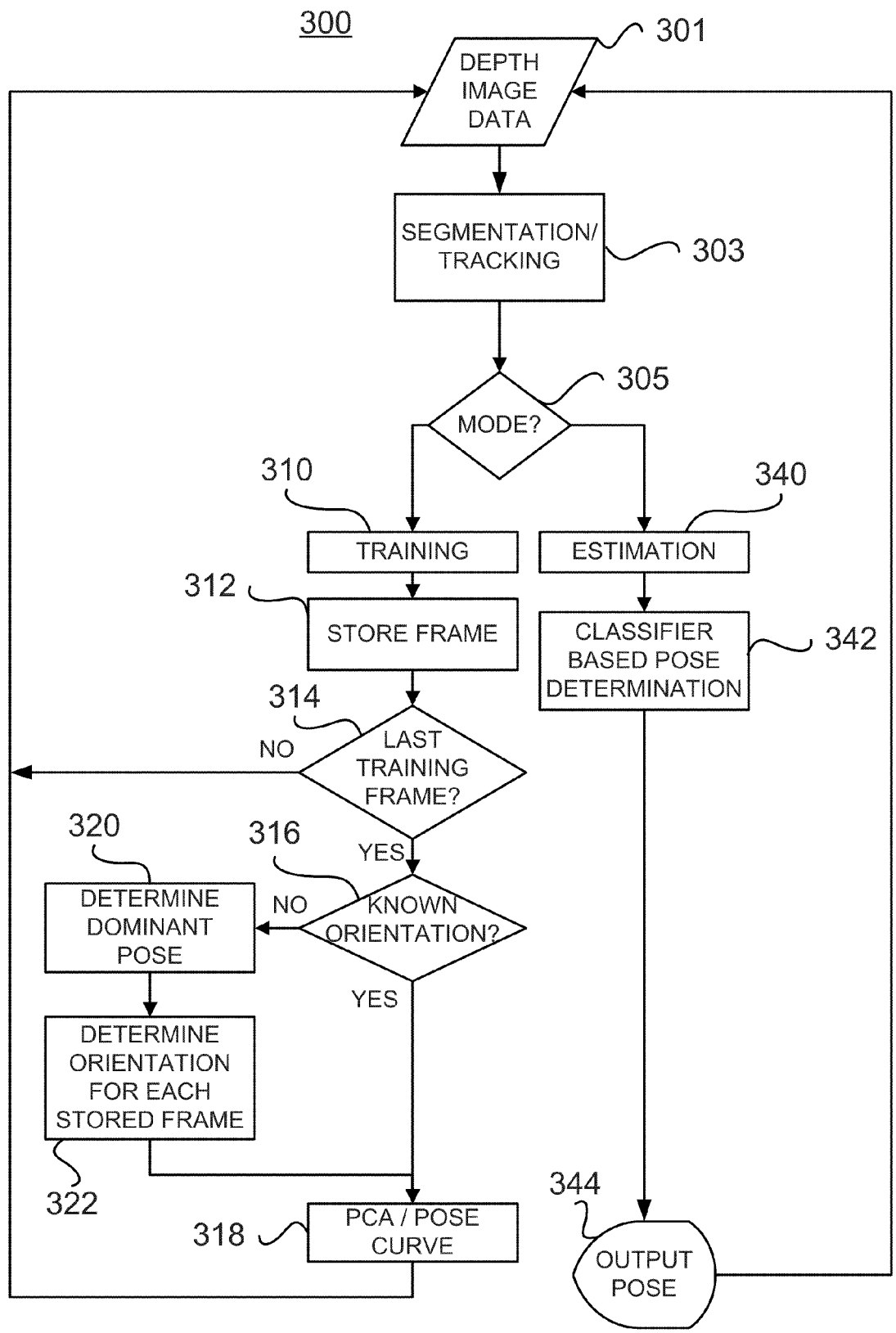
FIG. 3A shows a flow chart of a method for operation of one embodiment of an orientation estimation system.

FIG. 3A shows a flow chart of a method for operation of one embodiment of an orientation estimation system. In this embodiment, the orientation estimation method 300 operates over a set of hybrid images or hybrid image stream that includes depth data, e.g., a depth sensing video input. The depth image data is input 301 to the system. Image segmentation and tracking 303 takes place to determine the location of pixels in the image corresponding to the target whose orientation is being estimated. The method 300 operates in two modes. A mode determination is made 305 to select how to proceed. For example, initially, the method 300 operates in training mode for a certain training period. The training period can be determined based on time, a number of frames, a selectable indicator, or the like.

While operating in training mode 310, the current frame is recorded or stored 312. Based on the mode determination, the method would determine 314 whether the current frame is the last training frame to be recorded. For example, last frame of a maximum number of frames, or last frame within training time period, or last frame required for a particular number of poses, or the like. The method then checks 316 whether the training frames include pose/orientation information. If the orientation is known, e.g., target is positioned at a predetermined pose for each frame, analysis of the stored frames is performed 318 to derive a pose curve. If the orientation is unknown, a dominant pose is determined 320 and the frames are cycled through to determine 322 an orientation value for each of the training frames. Once the orientation is known, the same analysis is performed 318 to derive the pose curve, which is used during the estimation process.

Once the training mode is completed, e.g., a mode change flag is set after pose curve is calculated, when the mode is checked 305 for a subsequent frame, the method proceeds to the estimation mode 340. In the estimation mode 340, the current frame is compared 342 with the stored training set to determine a pose based on a classifier. The pose for the current frame is output 344.

Figure 3B:
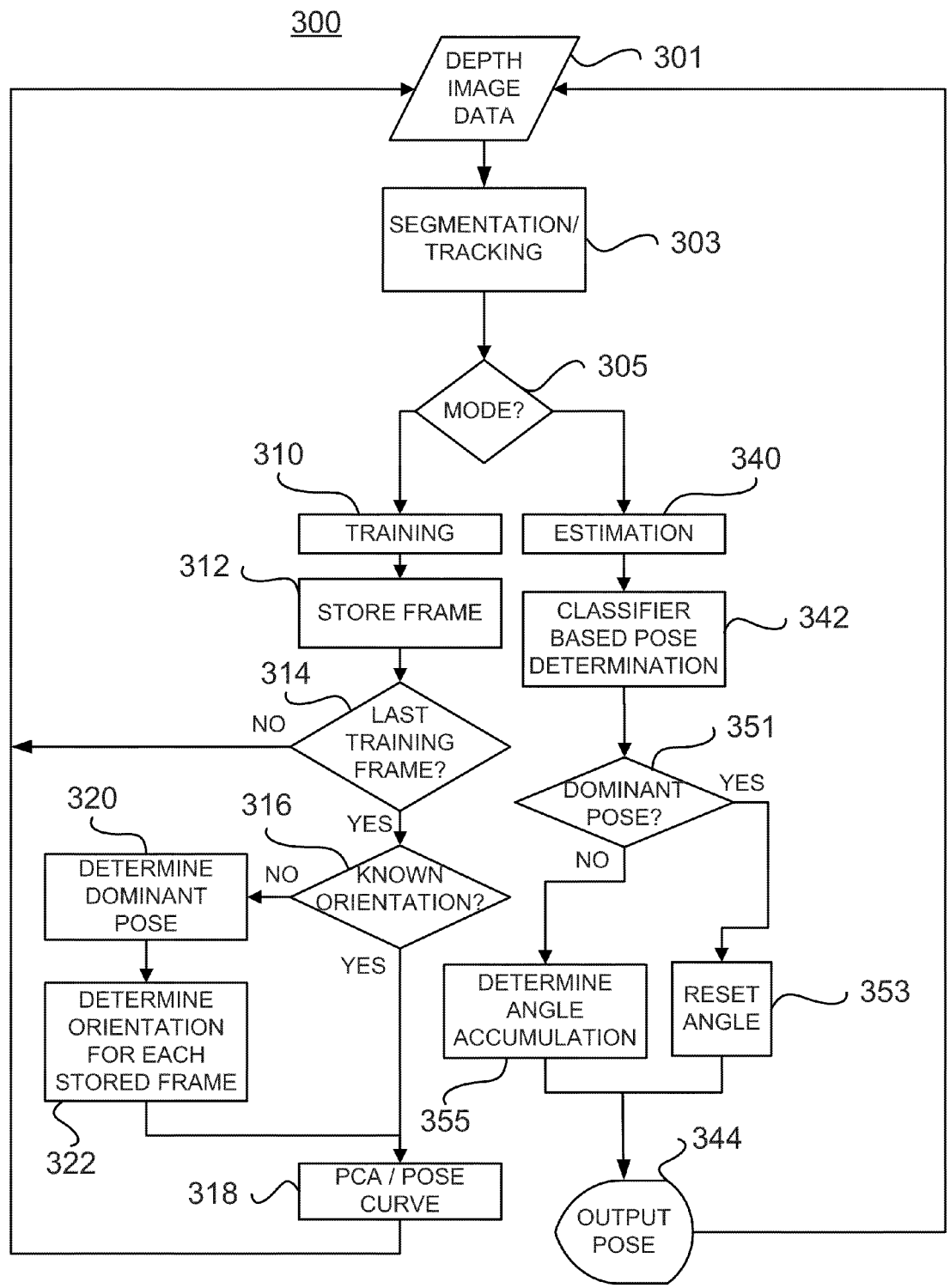
FIG. 3B shows an alternative embodiment using a motion-based approach.

Now referring to FIG. 3B, an alternative embodiment using a motion-based approach is shown. The classification 342 provides information sufficient to determine 351 whether the current frame corresponds to the dominant pose. If the current frame does not correspond to the dominant pose, the accumulation-based orientation of the current pose is determined 355. If the current pose corresponds to the dominant pose, the orientation value is reset 353 to the reference orientation value. The orientation value for the current frame is output 344 and the next frame is processed.

Segmentation and Tracking

In order to estimate the orientation or pose of a target based on static or motion pictures (i.e., an image or image stream) of the target, a preliminary task is to determine the location of the target within the image. For example, to determine the head pose of a driver, e.g., to determine whether the driver is looking forward or sideways, based on images taken of the driver area of a vehicle's cabin, the images need to be analyzed to find the driver's head within them. The image processing for determining which pixels correspond to the target 104 is referred to as image segmentation. The segmentation process finds a "segment" of the image that represents the target 104. Additionally, when the orientation estimation is performed on a stream of frames or images, the location of the target may vary between frames. Accordingly, the "segment" in the images corresponding to the target 104 needs to be tracked from frame to frame in order to determine the changes in orientation. This process is referred to as tracking. For real-time pose or orientation estimation systems, both of these processes take place expeditiously (e.g., in the segmentation and tracking module 112), thus, simple fast computations are preferred.

Referring back to FIG. 2A, depth images of a driver in different positions are shown. In depth image 200a, the target 201 (e.g., a driver) is shown in a regular position with the head 203 straight up (e.g., driving), in the center of the image 200a. In depth image 200b, the target 201 is shown tilting to the side, e.g., reaching the glove compartment, with the head 203 in the left side of the image 200b. In general, a depth image 200 is an image captured by a depth-sensing camera, which operates as described above. In addition to conventional digital image information, a depth image 200 includes depth information for each pixel. The depth information is visually represented with variations in the pixel intensity or brightness according to the depth values. As represented in the depth images 200 of FIGS. 2A, 2B, and 2C, the pixels for objects closer to the camera appear brighter and they get progressively darker with higher depth values up to the pixels for objects at or beyond the maximum operating depth (or distance) of the camera, which are shown as black.

A benefit of using depth information with respect to the segmentation and tracking processes is that it enables the filtering of image data based on distance from the camera. Accordingly, if the general distance from the camera to a target is known, background/cluttering information can be filtered out to simplify the segmentation and tracking processes. In fact, some depth cameras provide a "depth window" feature to set a depth range of operation as described above with respect to FIG. 1A. In general, a depth window is a specified depth range for which the camera captures or senses depth information. For example, as shown in FIG. 2A, a depth camera used in a driver pose estimation system can be mounted on the front cabin, e.g., under the rear view mirror, front dash board, or the like. The camera can be set to a depth window that ranges from the steering wheel area 204 to the driver's seat 205. This setting avoids capturing extraneous information that would only serve to clutter the desired target's image. In this example, cluttering image information related to back-seat passengers is not captured thereby simplifying the segmentation and tracking process. In FIG. 2A, the background 206, is shown as black indicating that those pixels do not contain depth image information for any objects, i.e., there were no objects within the depth window captured by those pixels.

Now referring to FIG. 2B, a depth image with its corresponding color and depth data visual representations is shown. The depth image 200c includes the color information part 210 and the depth information part 212. In addition, a pixel-depth graph 214 is shown depicting a plot of pixel-depth distribution along the central vertical cross-section of the depth image 200c. A simple segmentation method according to one embodiment determines the general location of the target 201 within the image frame using this depth-pixel data. The method segments the image by counting the number of pixels exceeding a certain depth threshold along the horizontal scan-line 214. Where the general shape and size of the target are known, a simple alternative includes counting both in the horizontal and vertical scan-lines to find a set of pixels defining the shape of the target 201.

In an alternative embodiment, a contour fitting tracking technique is used to locate the target 201 in a frame and track its location changes between frames. In FIG. 2A, shows the output of such a tracking technique. A driver's head 203 is tracked using an elliptic fitting function that fits an ellipse 207 over the section of the depth image 200 estimated to correspond to the driver's head 203. A method to track a driver's head using this technique is disclosed in co-pending U.S. patent application Ser. No. 10/857,581 referenced above. Elliptic fitting is particularly adept for tracking human heads where the target head tends to mix in with other people's heads.

FIG. 2C shows an alternative embodiment of a tracking mechanism using depth images 200. In FIG. 2C, the outputs of a system based on the Mean shift algorithm are shown. The Mean shift algorithm is used for determining the position of a target 201 within the depth image 200d. In this embodiment, the target 201 is a person's head. A starting window 220 is randomly set in the general vicinity of the target 201. The algorithm then places a first iteration window 222 closer to the target and repeats itself until the final window 224 substantially contains the target 201.

In this Mean-shift-based embodiment of the tracking system, noisy pixels sensed from the background 206 have pixel depth values lower than the pixels corresponding to the target 201. A property of the Mean shift algorithm is that the final position of the window 224 will settle on the image region whose gravity center and geometric center match with each other. Details on the operation of the Mean shift algorithm can be found at Comaniciu and Meer, "Mean shift: a Robust Approach Toward Feature Space Analysis," IEEE Transactions of PAMI 24, No. 5, pp. 1-18, May 2002, incorporated herein by reference in its entirety. The Mean shift algorithm can be adaptively applied to depth images 200 shifting the location of the output window 224. When the two centers do not match, the Mean shift algorithm will center the window on the gravity center (window 222) and start the next iteration. A tracking system based on Mean shift algorithm operation is particularly adept for tracking a face location in image streams when the face has back-and-forth movements.

For other embodiments, a Kalman filter or a Gaussian Mixture Model ("GMM") are other alternatives to work as a general estimation and prediction tool for the general location of the target within an image.

Target Size Estimation

In one embodiment, a segmentation and tracking module includes a size estimation module to provide size information relative to the shape of a particular target. For example, in a face pose estimation system, once the general location of the face is found within the image, for example using the Mean shift algorithm to settle the window on the target face, the size of the face can be adaptively calculated using spatial statistics. For example, an observation based on an experimental embodiment of the system suggests that the size of the face is about 4 times the standard deviation in two orthogonal directions of the eigenvectors of covariance matrix. Therefore, one approach to the implementation of this embodiment includes the following calculations:

1. Distribution of face location:

$$p_{ij} = \frac{f(i, j)}{\sum_{i \in window} \sum_{j \in window} f(i, j)}$$

where $f(i, j)$ is the pixel value.

2. Face mean location:

$$xc = \sum_{i \in window} \sum_{j \in window} (ip(i, j))$$

$$yc = \sum_{i \in window} \sum_{j \in window} (ip(i, j))$$

3. Face location covarience:

$$COV = \begin{bmatrix} cov(i, j) & cov(i, j) \\ cov(j, i) & cov(j, j) \end{bmatrix}$$

4. Eigen decomposition of covariance matrix:

$$COV = U \begin{bmatrix} \sigma_1^2 & \\ & \sigma_1^2 \end{bmatrix} U'$$

5. Face size estimation:

length $a = 4\sigma_1$ with $b = 4\sigma_2$

The coefficient value of 4 is selected based on experimental results, however, any coefficient (generally between 4 and 6) that is a reasonable alternative can be used. The general relation between coefficients in the case of Gaussian distribution according to one embodiment of the system is base on an elliptic function due to the general shape of a human head. Similar relationships can be used for application to other target shapes. Experimental results can provide a range of reasonable relationships between coefficients applicable to the particular shape.

Adaptive Target Learning

Another aspect of a system for orientation determination includes the adaptive learning of the target's poses or orientation changes. A system according to this embodiment uses training images of the actual target captured in real-time during an initialization period. A classifier is then used to operate based on a subject and environment-specific library instead of using some target-independent generalized database. For example, a face pose classifier based on Hidden Markov Model (HMM) is used to model component-wise human face configurations using an adaptively learned target-specific training set. One benefit of this approach is that the target's appearance variation or environment differences with respect to a generalized target stored in a database will not affect performance. For example, when the system operates on persons, it is generally observed that person-dependent embodiments outperform generalized target models, with the same amount of training data used.

In one embodiment, the adaptive learning of the target takes place during an early part of the video data capture, the initialization or training period. This initial video is used to collect a set of training frames of the particular target in the particular environment, while for the remaining part of the video, learned target-specific features are used repeatedly for the target orientation or pose estimation. This way, target-specific and local condition (such as, e.g., lighting) can be incorporated into the training set and eliminated as a source of "noise" in the appearance based comparisons. In an alternative embodiment for an application exceeding a minimum duration, missing classification results during the initial part of the session (training period) do not detrimentally affect performance, Instead, additional training examples are extracted adaptively through principal component reduction analysis ("PCA") as necessary during operation.

Figure 4A:
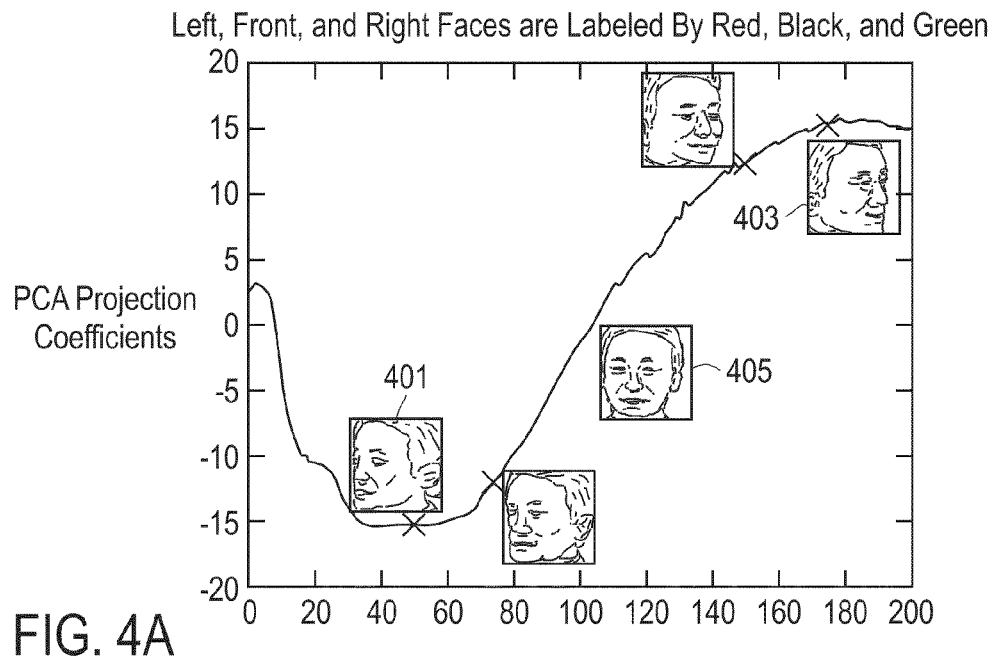
FIG. 4A shows a PCA projection curve.
Figure 4B:
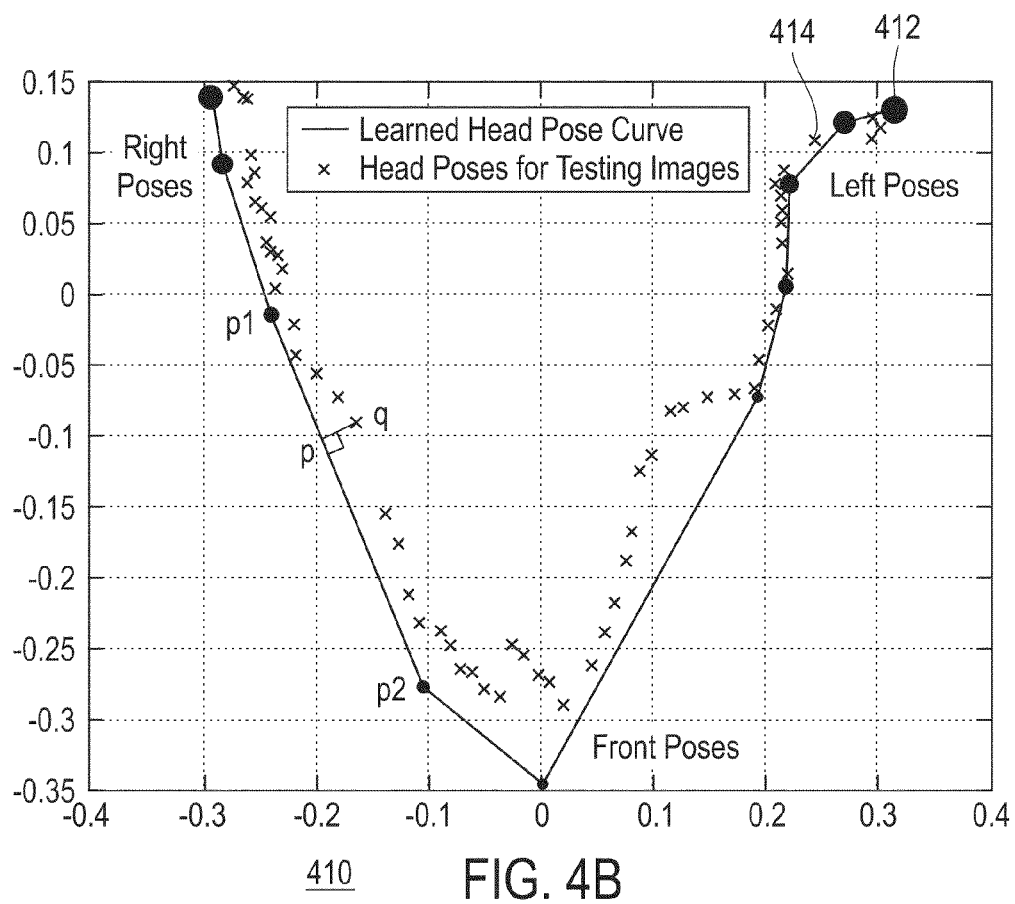
FIG. 4B shows a different representation of the PCA projection in a Head Pose Curve.

One embodiment of the adaptive target learning system used to compose the training set is based on PCA analysis. In one embodiment, the PCA based target learning system is used for a human face pose estimation system. It is known that face images from side profile to side profile form a pose eigen-space that can be used for pose extraction. FIGS. 4A and 4B illustrate this face pose eigen-space relationship. FIG. 4A shows a PCA projection curve 400 for a set of 200 frames capturing a target head rotation from a front pose 405, through a left profile 401 to right profile 403 in a full cycle. FIG. 4B shows a different representation of the PCA projection in a Head Pose Curve 410. The Head Pose Curve 410 is parameterized by pose angle and is formed from projection onto the first two eigenvectors. Circles 412 are projections of training observations and crosses 414 are projections of other observations among an image sequence with various head poses. The size of circle represents the degree of side-facing, larger meaning greater lateral rotation or higher degree.

The following PCA procedure is an example for calculating a pose eigen-space according to one embodiment of the present invention:

Defining m dimensional column vector x, where m=p×q, and p, q are the face image size.

Forming the observation vectors: $\{x_1, x_2, \ldots, x_n\}$ from the sequence of face images.

Calculating the mean u and covariance matrix $\Sigma$ based on:

$$u = \frac{1}{n}\sum_{i=1}^{n} x_i$$

$$\Sigma = \frac{1}{n}\sum_{i=1}^{n} (x_i - u)(x_i - u)^T$$

Calculating the first largest K eigenvalues $\lambda_j$ and corresponding eigenvectors $\phi_j$ (j=1, 2, . . . , K) of covariance matrix $\Sigma$:

$$\Sigma \phi_j = \lambda_j \phi_j$$

For any image vector x, its K dimensional projection coefficient vectors are calculated by:

$$\omega_j = \phi_j^T (x-u)$$

Expressed differently, this PCA procedure is used in one embodiment for extracting the training set and to derive a projection matrix and a Head Pose Curve 410 as shown in FIG. 4B. This training algorithm is based on M training observations $\{x_1, x_2, \ldots, x_M\}$ having known pose angles (distributed within a certain range of angle), where each observation image $x_i$ is expressed as a column vector with length of N=K×L. The training algorithm includes the following steps:

a. Step 1: Constructing the mean vector and covariance matrix $$\bar{x} = \frac{1}{M}\sum_{i=1}^{M} x_i, \quad C = \frac{1}{M}\sum_{j=1}^{M} (x_i - \bar{x})(x_i - \bar{x})^t$$

Step 2: Performing PCA analysis $$\underset{N \times N}{C} = \underset{N \times N}{U} \underset{N \times N}{\Lambda} \underset{N \times N}{U^t} \approx \underset{N \times P}{U} \underset{P \times P}{\Lambda} \underset{P \times N}{U^t}$$

where the first P eigenvectors corresponding to the largest P eigenvalues of C are selected as the optimal linear approximation of eigenspaces.

Step 3: Estimating pose curve

For each observation $x_i$, one can project it onto P-dimensional eigenspaces, that is:

$$\underset{P \times 1}{w_i} = \underset{P \times N}{U^t}(x_i - \bar{x})$$

Accordingly, Head Pose Curve 410 is formed by connecting these $w_i$(i=1, . . . , n), where n is the number of face poses to be used in a subsequent Estimation Phase.

The process described above produces a set of target-specific images that can be recorded in a database for subsequent use in pose estimation for example in conjunction with the Head Pose Curve 410. However, this process requires the acquisition of the target-specific images with a known pose or orientation. For example, during the training period, the target is rotated in a full cycle from one extreme orientation to another. In one embodiment, this could be accomplished by instructing a person to rotate his head from left to right in front of the camera during an initialization of the system.

To avoid this orientation or pose initialization requirement, in applications requiring a target to maintain a certain pose for a majority of the time, an alternative adaptive learning embodiment is used. This certain pose will be referred to as dominant pose or reference orientation. According to this embodiment, the dominant pose is initially determined. The dominant pose detection is based on the observation that a target spends most of the time in a particular pose. For example, a driver spends most of the time looking forward, i.e., in the front pose, rather than sideways during normal driving conditions. Accordingly, in a driver head pose determination system, the front pose is initially determined. In other applications, the dominant pose may be different.

Figure 4C:
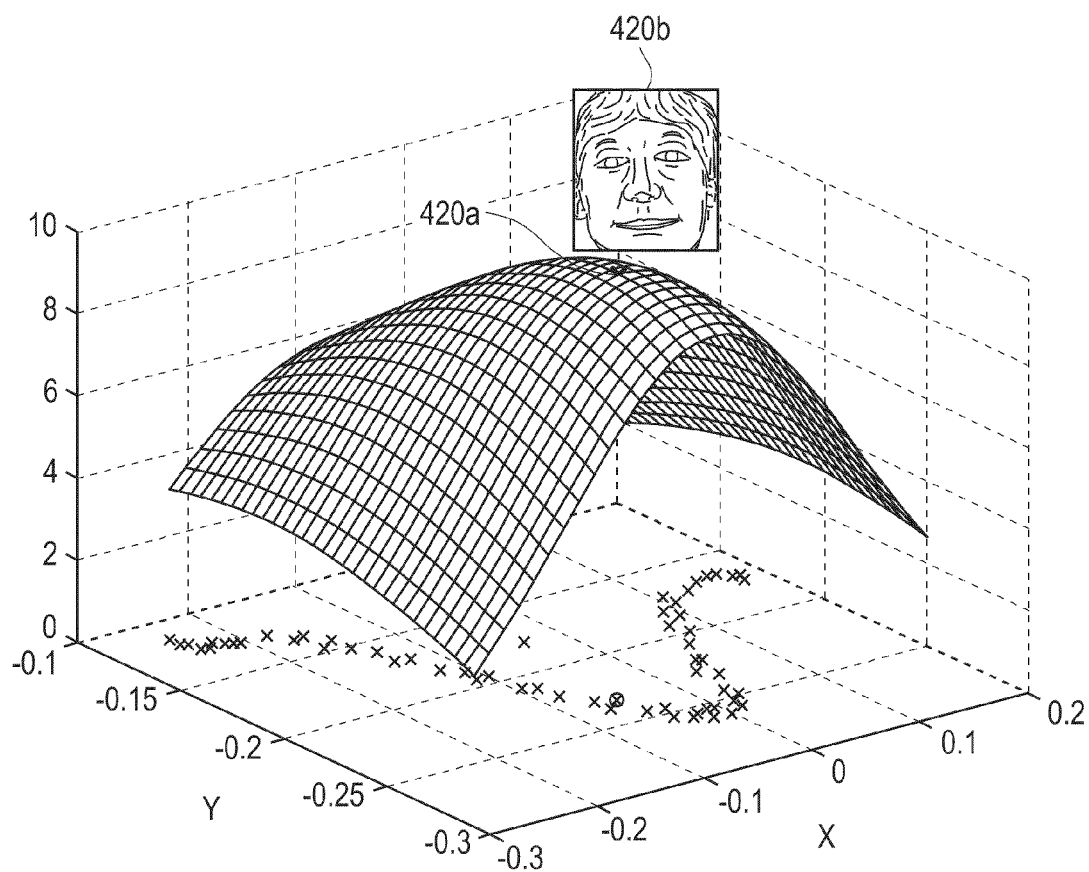
FIG. 4C shows a Parzen window approach for a dominant pose determination according to one embodiment.

To determine the dominant pose, a relatively long (e.g., 900 frames) training session is used. The most frequent pose recorded during this training session is assumed to be the dominant pose. In the driver head-pose tracking embodiment, the most frequent pose is assumed to be the front pose. It should be noted that not all persons drive looking straight forward, a slight orientation to one side or the other may be the dominant pose. This slight variation does not affect the performance of the system since the system measures variations in pose with respect to a dominant or most frequent pose, for example as a sign of attentiveness. One method to determine the most frequent pose in a recorded training image set is based on the head pose probability density function ("PDF"). The PDF is estimated based on the Parzen window approach as shown in FIG. 4C. In FIG. 4C, a distribution of poses based on related frames is shown. The mean 420*a* is the maximum of the three-dimensional space formed by the frames. A corresponding dominant pose 420*b* is also shown. Further details of the Parzen-window approach are described in Duda, et al., "Pattern Classification," (John Wiley & Sons, Inc., 2001), incorporated herein by reference in its entirety.

The front head pose 420*b* is detected as the mode of the PDF of face image distribution from randomly taken video image frames during a training period as follows:

Perform a PCA analysis of the image frames.
Estimate the PDF using the Parzen window approach.
Find the dominant head pose as the mode of the PDF.
The front head pose is detected if its pose remains as dominant pose for a certain number of frames.

This procedure is similar to the selection of the images corresponding to the bottom the Head Pose Curve 410 composed as described above. The images corresponding to the bottom of curve 410 are images of the front pose of the target in a driver head pose estimation system.

Three-Dimensional Motion Recovery

Figure 5:
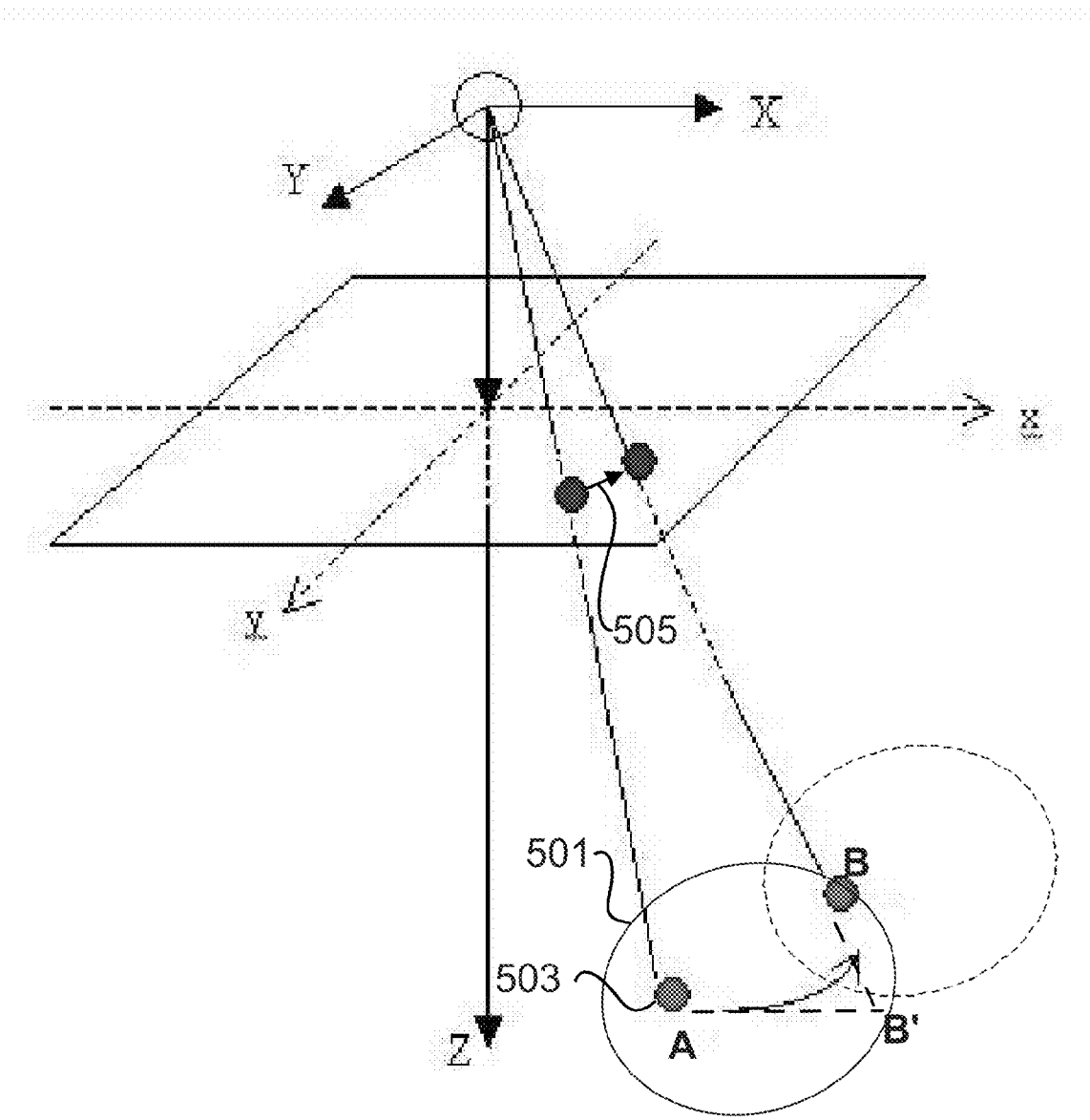
FIG. 5 shows a generalized optical flow diagram.

Another aspect of an orientation detection system includes three-dimensional rotation estimation based on depth image data. Recovering three-dimensional ("3D") motion from two-dimensional ("2D") optical flow is an inherently ambiguous task. Referring to FIG. 5, a generalized optical flow diagram is shown to illustrate this problem. For illustrative purposes, target 501 is assumed to be a person's head, however it could be any rigid object. As the person moves about, each point 503 in the target 501, moves from a first location A to second location B. The first frame of an image sequence corresponds to point 503 at location A and a subsequent frame corresponds to point 503 at location B. Determining the 3D head motion estimation from such an image sequence from the 2D optical flow 505 from the image data presents an ambiguity problem. The rotation of the target 501 at a far distance from location A to location B generates a 2D flow field similar to the one generated by a translation parallel to the image plane from location A to location B'. Accordingly, the 3D motion estimation cannot distinguish between the rotation and the translation options. To address this ambiguity problem, one embodiment of the depth-based optical flow analysis method includes the depth information constrain to eliminate one of the two options, translation or rotation, based on the changes in depth between two depth images in the sequence.

Accordingly, the relative motion estimation of this embodiment derives target orientation in rotation angles $E_t = \{\alpha_t, \beta_t, \gamma_t\}$ from an image sequence $I_t$. The system is initialized with the dominant pose or reference orientation at t=0. The dominant pose is determined as described above. At this initial time, the initial rotation angles are set to 0 (reference orientation in frame $I_0$). For example, in the driver head pose estimation system, the front pose corresponds to the initial 0-degree orientation at t=0. The following process is used to collect a set of M reference images $\{x_1, x_2, \ldots, x_M\}$ of the target with known orientation given by the $E_t$ corresponding to each of the M frames collected.

First, the 2D optical flow 505 ($u_i$, $v_i$) is estimated from the image data. Sparse motion fields in the target region ("textured window") between two successive frames ($I_{t-1}$ and $I_t$) are estimated using the Tomasi-Kanade algorithm. For details in this algorithm see Tomasi and Kanade, "Detection and Tracking of Point Features," Carnegie Mellon University Tech. Report CMU-CS-91-132, April 1991, incorporated herein by reference in its entirety.

Secondly, the rotation ($R_t = \{\Delta\alpha, \Delta\beta, \Delta\gamma\}$) and translation parameters between two successive frames are estimated using 2D motion fields and the depth constraints derived from the depth image data. This 3D motion estimation method is described as follows.

A 3D infinitesimal motion at (x,y,z) defined by (Tx, Ty, Tz, $\alpha$, $\beta$, $\gamma$) induces a 2D motion optical flow ($\Delta$x, $\Delta$y) on the image plane. These are related as follows (F is the focal length of the depth camera 202):

$$\begin{cases} \Delta x = \dfrac{F}{Z}T_X - \dfrac{x}{Z}T_Z - \dfrac{xy}{F}\alpha + \left(F + \dfrac{x^2}{F}\right)\beta - y\gamma \\ \Delta y = \dfrac{F}{Z}T_Y - \dfrac{y}{Z}T_Z - \left(F + \dfrac{y^2}{F}\right)\alpha + \dfrac{xy}{F}\beta + x\gamma \end{cases}$$

Known variables are:

(x, y): the position of optical flow point (u, v): the optical flow

F: camera focal length

Z: depth from depth image

Unknown variables are:

($T_X$, $T_Y$, $T_Z$): the translation of 3D motion ($\alpha$, $\beta$, $\gamma$): the rotation angle of 3D motion The above equation can be written as Hx=b as follows:

$$H = \begin{bmatrix} \dfrac{F}{Z} & 0 & -\dfrac{x}{Z} & -\dfrac{xy}{F} & \left(F + \dfrac{x^2}{F}\right) & -y \\ 0 & \dfrac{F}{Z} & -\dfrac{y}{Z} & -\left(F + \dfrac{y^2}{F}\right) & \dfrac{xy}{F} & x \end{bmatrix}$$

$x = [Tx, Ty, Tz, \alpha, \beta, \gamma]^t$ $b = [\Delta x\ \Delta y]^t = [u\ v]^t$ where b is the 2D motion vector for a certain feature point.

Using this equation, we can construct the optimal criteria to recover 3D head motion as follows:

$$E = \sum_{i=1}^{N} f(b(i) - H(i)x) \Longrightarrow \hat{x} = \operatorname*{argmin}_{x}(E)$$

where N is the number of tracked feature points. H(i) and b(i) are formed by the i-th feature point. f(x) is the cost function. Empirically, the least absolute method with f(x)=|x| gives a more stable solution than the least square method with f(x)=x².

The simplex search of Nelder and Mead is used for of non-linear optimization problems of the least absolute method. For details on the Nelder-Mead simplex search see Nelder and Mead, "A Simplex Method for Function Minimization," Computer Journal, vol. 7, pp. 308-313 (1965), incorporated herein by reference in its entirety. Here it defines the initial simplex by selecting 7 points in the 6-dimension parameter space. And three operations called reflection, contraction, and expansion are applied to the initial simplex based on the configuration simplex. The iteration terminates when the change is sufficiently small. Although this embodiment has been described with respect to a head tracking system, the same principles apply for tracking of objects in general.

Figure 6A:
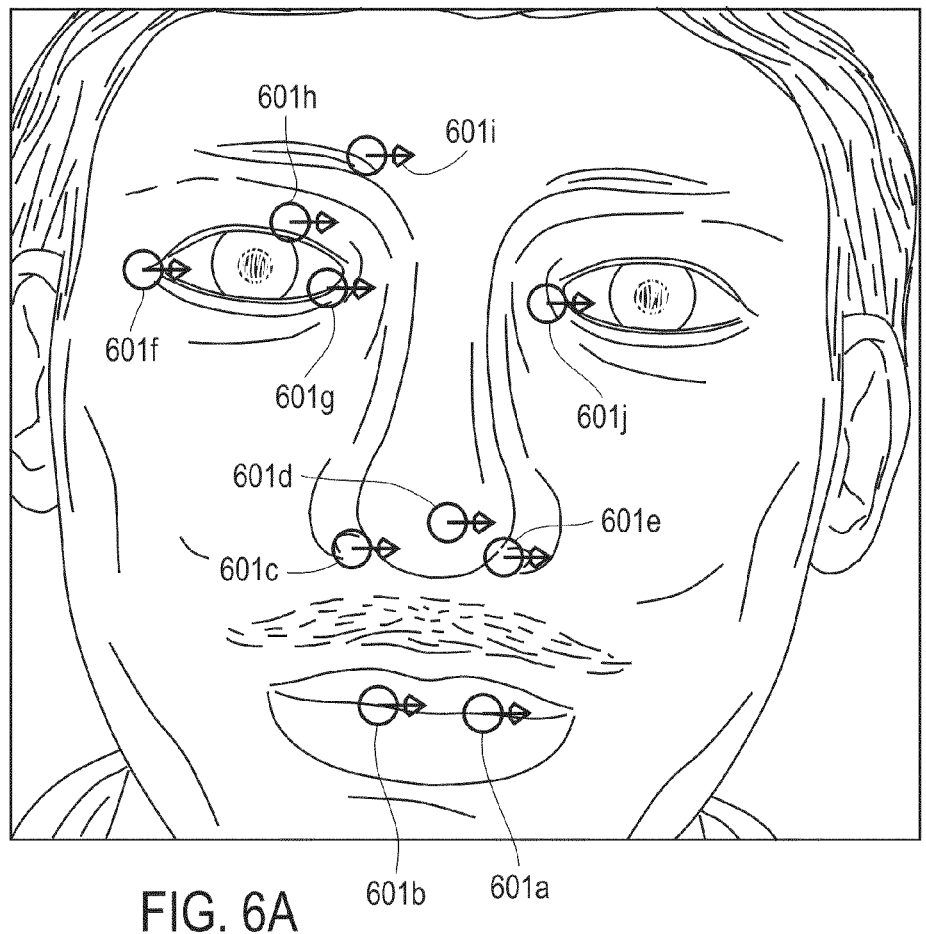
FIG. 6A shows a sample image for a driver head pose estimation system.
Figure 6B:
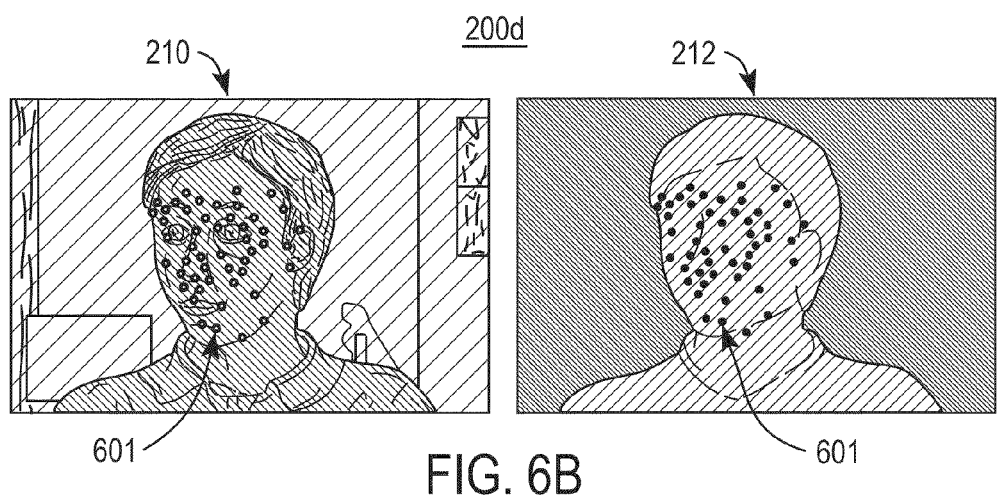
FIG. 6B shows a frame from a depth camera feed with hybrid data (color and depth) for a target.

Now referring to FIG. 6A, a sample image for a driver head pose estimation system is shown. The target head is shown in a front pose. In the image 200, 10 feature points 601a-601j (601 generally) are selected from distinctive features in the face that can serve as the basis for the optical flow analysis. FIG. 6B shows a frame from a depth camera feed with hybrid data (color and depth) for a target. In both parts (210 and 212) of the hybrid depth frame 200d, a set of N points 601 are indicated for use in the optical flow analysis. As compared with FIG. 6A, the higher number of feature points 601 shown in FIG. 6B can provide higher accuracy of the estimator. However, the higher accuracy comes at the expense of processing time. Thus, a balance between time response and accuracy required for the particular application determines the optimal number of feature points 601.

During the initial training period, as the M frames are collected, the corresponding orientation is calculated with the incremental rotation measure as a simple increment in rotation angles with each frame starting from the initial reference orientation for $x_i$ $I_0 \equiv E_0 = (0,0,0)$:

$$E_t = E_{t-1} + R_t$$

$$t = t+1$$

Figure 7:
FIG. 7 shows sample training set according to one embodiment of an orientation estimation system.
Figure 8:
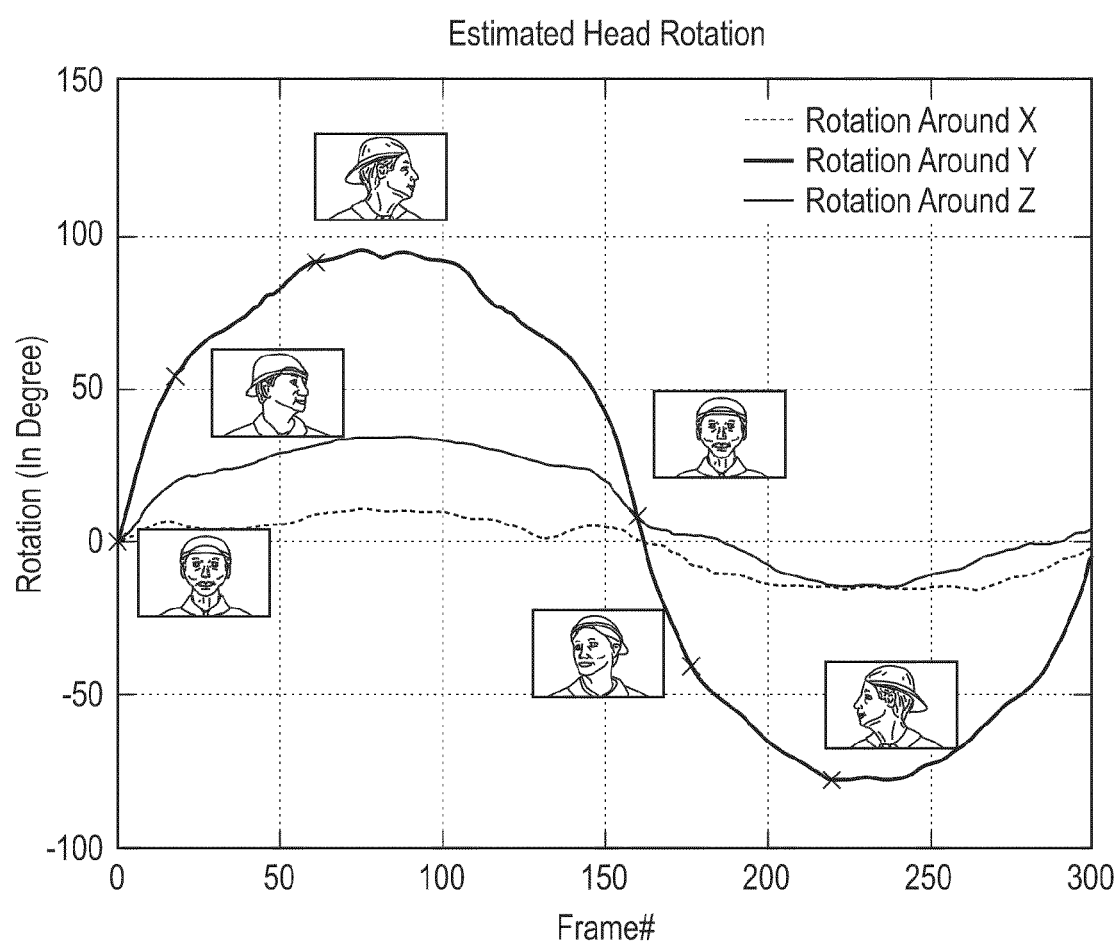
FIG. 8 shows a plot of a 300 frame video stream in which a target rotates his head from the −75 deg to the +75 deg around the Y axis with the corresponding rotation angles or orientations in the three spatial dimensions (x,y,z).

Once the set S of M training sample frames $\{x_1, x_2, \ldots, x_M\}$ with corresponding orientations $\{E_1, E_2, \ldots, E_M\}$ are collected, the Adaptive Subject Learning procedure described above can be performed to derive a set of subject specific database of pose images with corresponding orientations. A sample training set is shown in FIG. 7 in which pose images with angle varying from −75 to 75 degrees by every 15 degrees were collected. FIG. 8 shows a plot of a 300 frame video stream in which a target rotates his head from the −75 deg to the +75 deg around the Y axis with the corresponding rotation angles or orientations in the three spatial dimensions (x,y,z).

Orientation Estimation

Once the subject-specific image database with corresponding orientation values has been determined, several real-time orientation estimation embodiments can be used.

Figure 9:
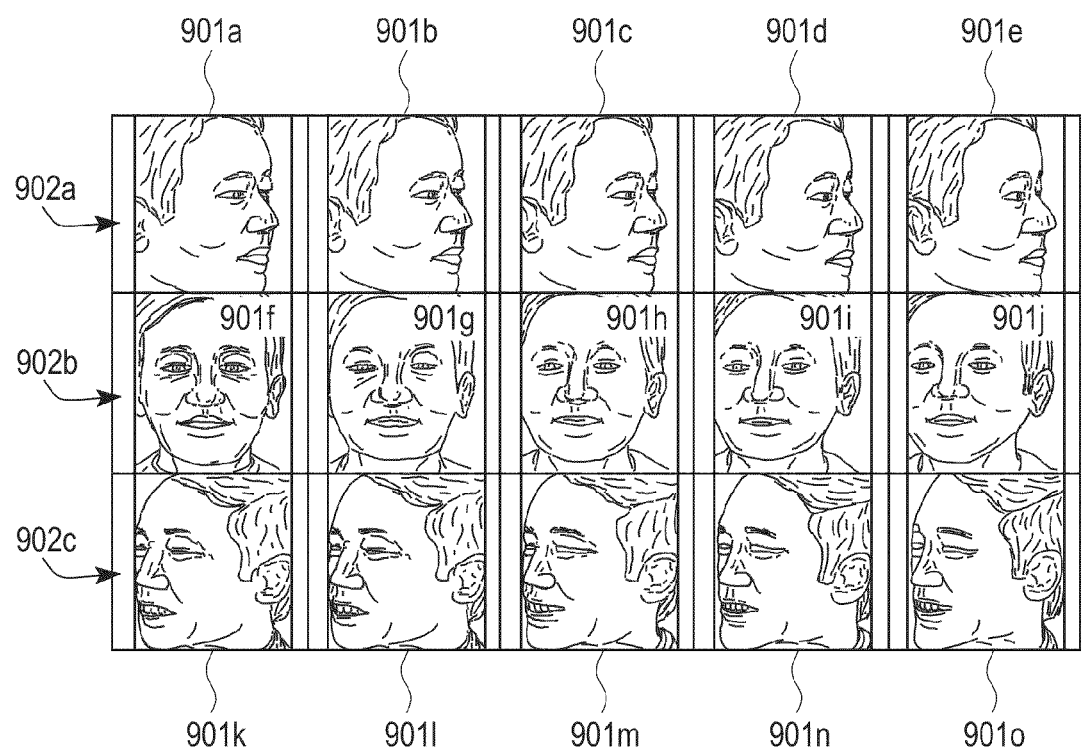
FIG. 9 shows one embodiment of a sample training-database for a three-pose system based on a classifier.

In one embodiment, a pose estimation system is based on a set of n training frames $w_i (=1, \ldots, n)$ with n distinct poses to be tracked. The system's resolution is n, that is, the input is classified in one of the n distinct poses. One sample training-database for a three-pose system is shown in FIG. 9. This database includes five sample frames 901a-901o for each of the three poses 902a-902c. Several frames 901 of the same pose 902 are included to take into account some variability between frames 901, i.e., to provide a range of observed target poses for each system predetermined pose 902 (i.e., left, center, right). As new frames (observations) are received, the frames are compared with the training images and the resulting pose will be the closest of the three possible stored predetermined poses (902a, 902b, or 902c) to the pose in the current image frame (observation y).

In one embodiment of a driver face pose estimation system, a Hidden Markov Model ("HMM") based classifier is used. HMM for face recognition has been used previously. This approach is based on the fact that the human face exhibits the special top-bottom structure configuration. Embedded HMM has been suggested to model the horizontal structure of a human face. HMM based methods are relatively robust due to their partial invariance to small rotation in and out of the image plane. Hence, in order to have a soft face pose classifier, the following procedure based on the HMM classifier is used in one embodiment.

Initially, the minimum point in the PCA projection coefficient curve determined above is located. Then, five face frames 901k-901o around this point are selected as right-facing pose 902c training examples (bottom row shown in FIG. 9). Similarly, the maximum point in the PCA projection coefficient curve is found and five face frames 901a-901e around it selected as left-facing pose 902a training examples (top row in FIG. 9). Five face frames 901f-901j selected near the zero value point in the PCA projection coefficient curve are used as front-facing pose 902b training examples.

Once the training examples are determined, three HMM models for left-facing, front-facing, and right-facing faces are trained independently. The classification of new input face pose is based on likelihood of face using the Viterbi algorithm. The model with the highest likelihood is the pose of the new face. The observation vector sequence extraction method can also be used.

In an alternative embodiment, the pose estimation for each observation y is calculated as follows. The new observation y is projected onto P-dimensional eigenspaces:

$$z = U_{P \times N}^t (y - \bar{x}).$$

Based on this projection, the pose can be estimated either by finding the nearest neighbor $$w = \min_{w_i} \|z - w_i\|,$$

or by performing linear interpolation between $w_i$ to obtain a continuous estimation of pose.

Yet another embodiment of an orientation estimation system is based on the above adaptive learning process. This embodiment provides a set of rotation angles $E_t = \{\alpha_t, \beta_t, \gamma_t\}$ based on the 3D motion estimation described above. One problem with this process is the error accumulation due to the incremental nature of the computations, i.e., the final angle estimation of a frame is based on the addition of a small quantity on angle estimation from the previous frame. Over a short sequence or video stream, the error accumulation does not present a problem, however, over a longer sequence (e.g., 900 frames) the orientation estimate can drift significantly. In order to overcome this drift problem, the angle is reset every time the dominant pose is detected.

According to this embodiment, any of the above appearance-based techniques is applied to each frame $I_t$ to determine whether the pose in the current frame corresponds to the dominant pose (i.e., reference orientation). If it is determined that the pose in the current frame is the dominant pose, the orientation estimate is set to the reference value, e.g., $E_t = \{0, 0, 0\}$. Otherwise, the relative rotation $R_t = \{\Delta\alpha, \Delta\beta, \Delta\gamma\}$ is estimated as described above. Then, the orientation estimate is updated, $E_t = E_{t-1} + R_t$.

Generally, this embodiment assumes that during a session, the target's appearance does not change significantly (after the adaptive learning phase). As described above, the target-specific database is made up of depth images, which reduces the potential influence of changing lighting conditions. Similarly, infrared imaging can be used to provide some level of robustness against lighting condition variation.

A further embodiment of a pose-tracking system includes a variation to the 3D-motion and appearance based hybrid embodiment described above. According to this embodiment, when the target's appearance changes, (e.g., a driver taking of eye-glass, a hat, or the like), the performance of the system degrades. To address this issue, when a predetermined maximum performance degradation value is reached, the adaptive learning phase (training phase) is re-executed to compose a new target-specific image database. The performance degradation can be calculated based on the departure of PCA values from what the values initially learned. Alternatively, the adaptive learning training sequence can be periodically run so as to ensure that the correct front face is used.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer based method for estimating a real-time orientation measure for a target using depth video image data, the method comprising the steps of:
    receiving as input a feed of depth video frames, the depth video frames capturing the target in real-time and including depth pixel data;
    storing a target-specific training set of depth video frames during an initial training period;
    identifying frames of the target-specific training set of depth video frames capturing the target in a dominant orientation by analyzing the target-specific training set of depth video frames;
    comparing, based in appearance, a current depth video frame with the target-specific training set of depth video frames to determine whether the current depth video frame includes the target in the dominant orientation;
    determining a current orientation measure based in part on depth data corresponding to the current depth video frame, the current orientation measure corresponding to a current orientation of the target captured in the current depth video frame; and
    setting the current orientation measure to a reference orientation measure in response to determining that the current depth video frame includes the target in the dominant orientation.

2. The method of claim 1, wherein analyzing the target-specific training set of depth video frames includes performing a Parzen-window based PDF and determining the mode of the PDF.

3. The method of claim 1, wherein analyzing the target-specific training set of depth video frames includes segmenting each depth video frame to determine a segment of the frame that includes image data corresponding to the target.

4. The method of claim 3, wherein analyzing the target-specific training set of depth video frames further includes tracking the segment position from frame to frame based on one of an elliptic fitting method or a Mean shift algorithm.

5. The method of claim 1, wherein comparing, based in appearance, further comprises:
    determining a projection matrix and a pose curve using PCA analysis of the target-specific training set of depth video frames;
    projecting the current depth video frame onto a set of multidimensional eigenspaces based on the projection matrix; and
    estimating an orientation based on the projected current depth video frame.

6. The method of claim 5, wherein estimating the orientation includes finding a nearest neighbor based on the projection of the current depth video frame and points of the pose curve.

7. The method of claim 5, wherein estimating the orientation includes performing a linear interpolation between points in the pose curve corresponding to the projected current depth video frame.

8. The method of claim 1, wherein determining the current orientation measure further comprises:
    estimating an optical flow between feature points in a previous depth video frame and the current depth video frame to determine two-dimensional motion fields;
    recovering three-dimensional rotation and translation parameters between the previous depth video frame and the current depth video frame using the two-dimensional motion fields and depth constrains based on the depth pixel data corresponding to the feature points; and
    setting the current orientation measure to an accumulated orientation value based on an orientation measure for the previous depth video frame and the three-dimensional rotation and translation parameters.

9. The method of claim 1, wherein the target is a driver's head and the orientation is a head pose.

10. A computer readable storage medium for estimating a real-time orientation measure for a target using depth video image data, comprising a computer program that when executed by a computer processor implements the steps of:
    receiving as input a feed of depth video frames, the depth video frames capturing the target in real-time and including depth pixel data;
    storing a target-specific training set of depth video frames during an initial training period;
    identifying frames of the target-specific training set of depth video frames capturing the target in a dominant orientation by analyzing the target-specific training set of depth video frames;
    comparing, based in appearance, a current depth video frame with the target-specific training set of depth video frames to determine whether the current depth video frame includes the target in the dominant orientation;
    determining a current orientation measure based in part on depth data corresponding to the current depth video frame, the current orientation measure corresponding to a current orientation of the target captured in the current depth video frame; and
    setting the current orientation measure to a reference orientation measure in response to determining that the current depth video frame includes the target in the dominant orientation.

11. A system for estimating a real-time orientation measure for a target using depth video image data, the system comprising:
    means for receiving as input a feed of depth video frames, the depth video frames capturing the target in real-time and including depth pixel data;
    means for storing a target-specific training set of depth video frames during an initial training period;
    means for identifying frames of the target-specific training set of depth video frames capturing the target in a dominant orientation by analyzing the target-specific training set of depth video frames;

means for comparing, based in appearance, a current depth video frame with the target-specific training set of depth video frames to determine whether the current depth video frame includes the target in the dominant orientation;

means for determining a current orientation measure based in part on depth data corresponding to the current depth video frame, the current orientation measure corresponding to a current orientation of the target captured in the current depth video frame; and means for setting the current orientation measure to a reference orientation measure in response to determining that the current depth video frame includes the target in the dominant orientation.

* * * * *